Aug. 9, 1960     G. A. ARNOLD     2,948,368

MOLDING FASTENER

Filed May 9, 1957

INVENTOR:
GRAHAM A. ARNOLD,
BY Walter J. Jones
ATTORNEY.

United States Patent Office 2,948,368
Patented Aug. 9, 1960

2,948,368
MOLDING FASTENER

Graham A. Arnold, Middleboro, Mass., assignor to United-Carr Fastener Corporation, Cambridge, Mass., a corporation of Delaware Filed May 9, 1957, Ser. No. 658,077

1 Claim. (Cl. 189—88)

My invention aims to provide improvements in so-called molding fasteners for attaching a trim molding or the like to a panel structure which may be part of an automobile, refrigerator or similar article of commerce.

The object of my invention is to provide a simple sheet metal fastening device, preferably of one piece of metal, which has an improved construction for ease of assembly of the fastener to a panel.

Another object of the invention is to provide a bendable loop portion which may be distorted by a simple tool so that portions of the base of the fastener may be moved relative to each other, whereby the panel-engaging projections may be easily and quickly engaged through holes in the panel.

Referring to the drawings which illustrate a preferred embodiment of my invention:

Figure 1:
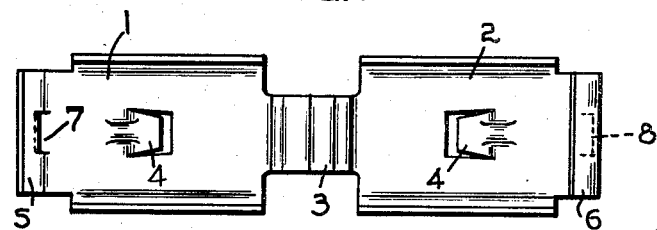
Fig. 1 is a plan view of my improved fastener.
Figure 2:
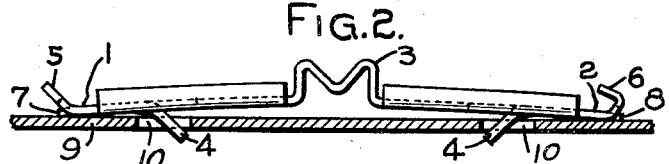
Fig. 2 is an edge view of the fastener associated with a panel section prior to attachment.

The particular fastener shown in the drawings is formed from a single piece of sheet metal and has a base divided into two portions, 1 and 2, connected by a squeezable reverse bend fold 3 preferably narrower than the base portions to permit easy bending. Each of the base portions 1 and 2 has a support engaging projection 4 extending from the underside and preferably angled toward each other as shown in Fig. 2. The base portion 1 has an upwardly flared flange-engaging portion 5, and the base portion 2 has hook-shaped flange engaging portion 6, the purposes of which will be hereinafter described. To complete the construction of my one-piece fastening device, I have provided a tab 7 on the base portion 1 and preferably a second tab 8 on the base portion 2.

Figure 3:
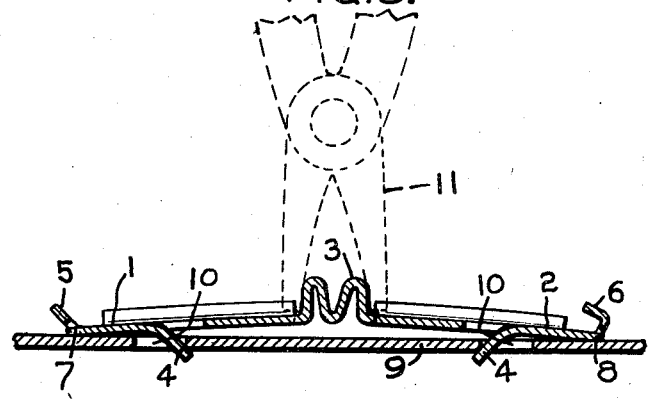
Fig. 3 is a view similar to Fig. 2, but also showing the fastener in cross section, and showing a pliers in dotted lines squeezing the fold to foreshorten the base of the fastener and engage the projections with the support.

In Figs. 2 and 3 I have illustrated the manner in which my improved fastener is attached to a panel 9 having spaced apertures 10—10. As shown in Fig. 2, the fastener is first placed on the panel 9 with the support engaging projections 4—4 extending into the apertures 10—10. Thereafter the reverse bend fold 3 is squeezed by a pair of pliers 11, partially shown on dotted lines in Fig. 3. In this manner, the base is foreshortened so that the portions 1 and 2 are moved toward each other and also so that the angled support-engaging projections hook under the support or panel 9 thereby securing the fastener in place. It will be noted that the base of the fastener is curved slightly in a direction away from the panel longitudinally so that, during attachment, the fastener may flatten somewhat as the support-engaging portions are hooked into engagement with the panel 9. In this manner I provide a fastener that may adjust itself to panels or supports 9 of different thicknesses.

Figure 4:
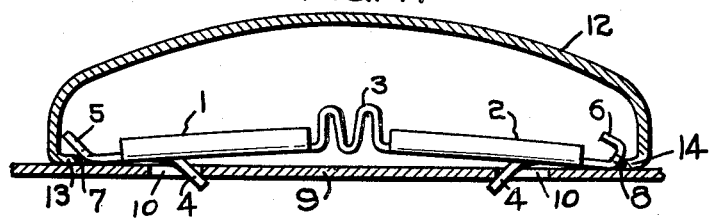
Fig. 4 is a section of a complete trim molding and panel with the fastener shown in elevation.

After the fastener is in position on the panel 9, a suitable molding 12 (Fig. 4) may be snapped into position on one or more of my improved fasteners according to the length of the molding. The molding may be slid onto the fastener longitudinally, but I prefer to snap it in place by first hooking the flange portion 13 under the upturned flange-engaging portion 5 and then snapping the other flange portion 14 over the hook-shaped flange engaging portion 6. By having this flange-engaging portion 6 hook-shaped or curved, it co-operates with the edge of the flange 14 to permit it to cam and snap into place as shown in Fig. 4. The tabs 7 and 8 engage the inner edges of the flanges 13 and 14 of the molding 12 thereby preventing the molding from sliding under the fastener when abnormal lateral strains are exerted on the molding.

Heretofore, many molding fasteners have been made and used, and they have been attached in all sorts of manners with and without tools. However, applicant believes that he is the first to provide a simple molding fastener where two base portions may be foreshortened toward each other preferably by squeezing a bendable portion to move two angled support-engaging portions toward each other for attachment. Furthermore, applicant believes that by providing his improved construction he is the first to have an assembly where the molding also cooperates with the fastener to maintain it in assembly with the panel by resisting pressures which might tend to move the support-engaging projections in a direction away from each other. Another important feature of applicant's construction is that it can be attached with a simple pair of pliers, and no special tool is necessary as in many former fastener constructions.

While I have illustrated and described a preferred embodiment of my invention, it should be understood that the invention is best defined by the following claim.

I claim:

A molding and like installation comprising, in combination, a support member having a pair of laterally spaced openings, a hollow molding having inturned flange portions engaging the surface of said support member and a molding fastening member attaching the molding to the supporting structure, said fastening member having a base provided with two portions laterally movable toward and away from each other and a fold portion connecting said movable portions of said base, said fold portion having spaced vertical arms connected to one another at their top free ends by downwardly inclined arm portions defining a fold portion M-shaped in configuration, a support engaging projection extending in inwardly inclined relationship from the underside of each movable portion of said base in the direction of one another, said support member engaging projections being substantially identical, each of said projections extending through an opening in said support member in inclined relationship therewith, said fold portions being squeezed inwardly thereby laterally moving said movable portions of said base toward each other and holding said fastener member to said support member with said projections engaging the edges of said openings, said two portions having molding engaging portions facing away from said fold and at the opposite ends of said base in engagement with said flange portions of said molding strip whereby the forceable engagement of the molding on said molding engaging portions tightens the engagement of said support engaging projections with the support member.

References Cited in the file of this patent

UNITED STATES PATENTS

| 2,476,207 | Brown | July 12, 1949 |
| 2,644,213 | Bedford | July 7, 1953 |
| 2,670,512 | Flora | Mar. 2, 1954 |
| 2,689,992 | Flora | Sept. 28, 1954 |

FOREIGN PATENTS

| 686,947 | Great Britain | Feb. 4, 1953 |
| 493,063 | Canada | May 19, 1953 |